United States Patent [19]

Bothun et al.

[11] 4,162,007

[45] Jul. 24, 1979

[54] MAGAZINE-LID COMBINATION FOR JACKETED MAGNETIC DISKS

[75] Inventors: Maynard E. Bothun; Curtis A. Larson; Gayland E. Lightner; David R. Wilson, all of Rochester, Minn.

[73] Assignee: International Business Machines Corporation, Armonk, N.Y.

[21] Appl. No.: 888,438

[22] Filed: Mar. 20, 1978

[51] Int. Cl.² .................... B65D 85/30; B65D 43/12
[52] U.S. Cl. .............................. 206/444; 206/311; 206/454; 360/133; 220/322
[58] Field of Search ............... 206/444, 309, 311, 387, 206/455, 454, 456; 220/331, 322; 221/83; 312/10; 353/116; 360/133, 135

[56] References Cited

U.S. PATENT DOCUMENTS

| 2,983,402 | 5/1961 | Gottsegen | 220/322 |
| 3,565,282 | 2/1971 | Staar | 221/83 |
| 4,048,050 | 9/1977 | Hillman | 220/331 |

OTHER PUBLICATIONS

IBM Technical Disclosure Bulletin, Dec. 1976, p. 2690.

*Primary Examiner*—William T. Dixson, Jr.
*Attorney, Agent, or Firm*—Keith T. Bleuer

[57] ABSTRACT

A magazine particularly for jacketed magnetic disks (which may be termed "diskettes") of the type disclosed in U.S. Pat. No. 3,668,658 and a lid fitting on a forward, sometimes open, end of the magazine. The lid has internal ribs for supporting weak side edges of the diskettes in the magazine particularly when the magazine is turned on its side, and the magazine has aligned internal bottom and top diskette supporting ribs. A swing connection is provided between the lid and the magazine adjacent the top of the magazine including L-shaped slots formed in side panels of the magazine extending from the forward edges thereof horizontally and then upwardly and a pair of pins carried by the lid and fitting in the L-shaped slots. The lid when placed on the magazine thus first moves horizontally but slanting forwardly and downwardly to first move the upper ends of its internal ribs between the diskettes and then upwardly and in swinging movement to close the magazine. The upper edge of the lid is chamfered to allow such swinging placement of the lid on the magazine. A U-shaped spring retainer releasably holds the lid closed.

4 Claims, 9 Drawing Figures

MAGAZINE-LID COMBINATION FOR JACKETED MAGNETIC DISKS

CROSS REFERENCES TO RELATED APPLICATIONS

The magazine-lid combination of this application is related to the magazine disclosed in the copending application of D. R. Wilson, Ser. No. 888,435, filed Mar. 20, 1978, and to the magazine disclosed in the copending application of D. Wilson, F. Wilkey and W. Aderman, Ser. No. 888,436, filed Mar. 20, 1978. The magazine lid combination of this application may be used in connection with the disk drive machines disclosed in the copending application of W. E. Beuch and M. N. Zell, Ser. No. 888,603, filed Mar. 20, 1978, and in the copending application of D. O. Castrodale and T. R. Fournier, Ser. No. 888,437, filed Mar. 20, 1978.

BACKGROUND OF THE INVENTION

The invention relates to jacketed magnetic disks (which may be termed "diskettes") of the type disclosed in U.S. Pat. No. 3,668,658, and more particularly the invention relates to magazine-lid combinations particularly suitable for use with such diskettes.

It has been previously proposed in said D. R. Wilson application Ser. No. 888,435, filed Mar. 20, 1978, to provide a magazine for such diskettes which may be used in a disk drive machine, for example. The magazine so proposed includes a bottom, a top panel and an end panel connecting the top panel and bottom allowing the other end of the magazine to be open when used in the disk drive machine. The bottom and top panel are provided with internal ribs and grooves for holding a plurality of the diskettes spaced and vertically disposed. The inside surface of the end panel is smooth and unribbed so that the diskettes may be moved fully back into the magazine without impedance, even though the diskettes may be slightly warped about horizontal axes. As long as the magazine and the diskettes are in vertical disposition, no particular distortion is caused to the diskettes; however, when the magazines and diskettes are laid horizontally for storage, for example, it has been found that the diskettes sag downwardly and permanently warp due to thermally induced creep of the diskette jacket material. This is particularly true at elevated temperatures and occurs in a relatively short time. Such diskettes have horizontally extending slots adjacent their edges at the open end of the magazine as well as slight edge notches put into the jacket material so as to render it somewhat flexible at these edges, and these weaken the diskettes at these edges and aggravate this warping problem. The slots receive magnetic transducers in the disk drive machine, and the edge notches allow a close compliance of the transducers with respect to the disk even through the disk may be slightly warped.

SUMMARY OF THE INVENTION

It is an object of the present invention to provide means for supporting the diskettes at their weakened edges at the end of the magazine which is open when used in a disk drive machine, with the supporting means being effective particularly when the magazine has been removed from the disk drive machine and is stored horizontally. More particularly, it is an object of the invention to provide an improved lid for such a magazine which is internally ribbed, with the ribs of the magazine corresponding in placement with the diskette locating ribs provided in the bottom and top panel of the magazine.

It is a further object of the invention to provide an improved connection of the lid with the magazine so that the lid must first be moved horizontally and in a disposition slanted downwardly and forwardly at the normally open end of the magazine so that the upper ends of the ribs of the lid first enter the spaces between the diskettes to assure correct register therewith and the lid may then pivot about the magazine into final magazine closing position. It is a further object of the invention to provide a spring retainer effective on the lower end of the lid for extending around the lid and releasably holding it in place on the magazine. It is contemplated that the spring retainer shall be of a type that normally, in unflexed condition, extends across the open end of the magazine (when the lid is not in place) for holding the diskettes from moving forwardly out of the magazine in handling the loaded magazine, for example.

DESCRIPTION OF THE PREFERRED EMBODIMENT

Figure 1:
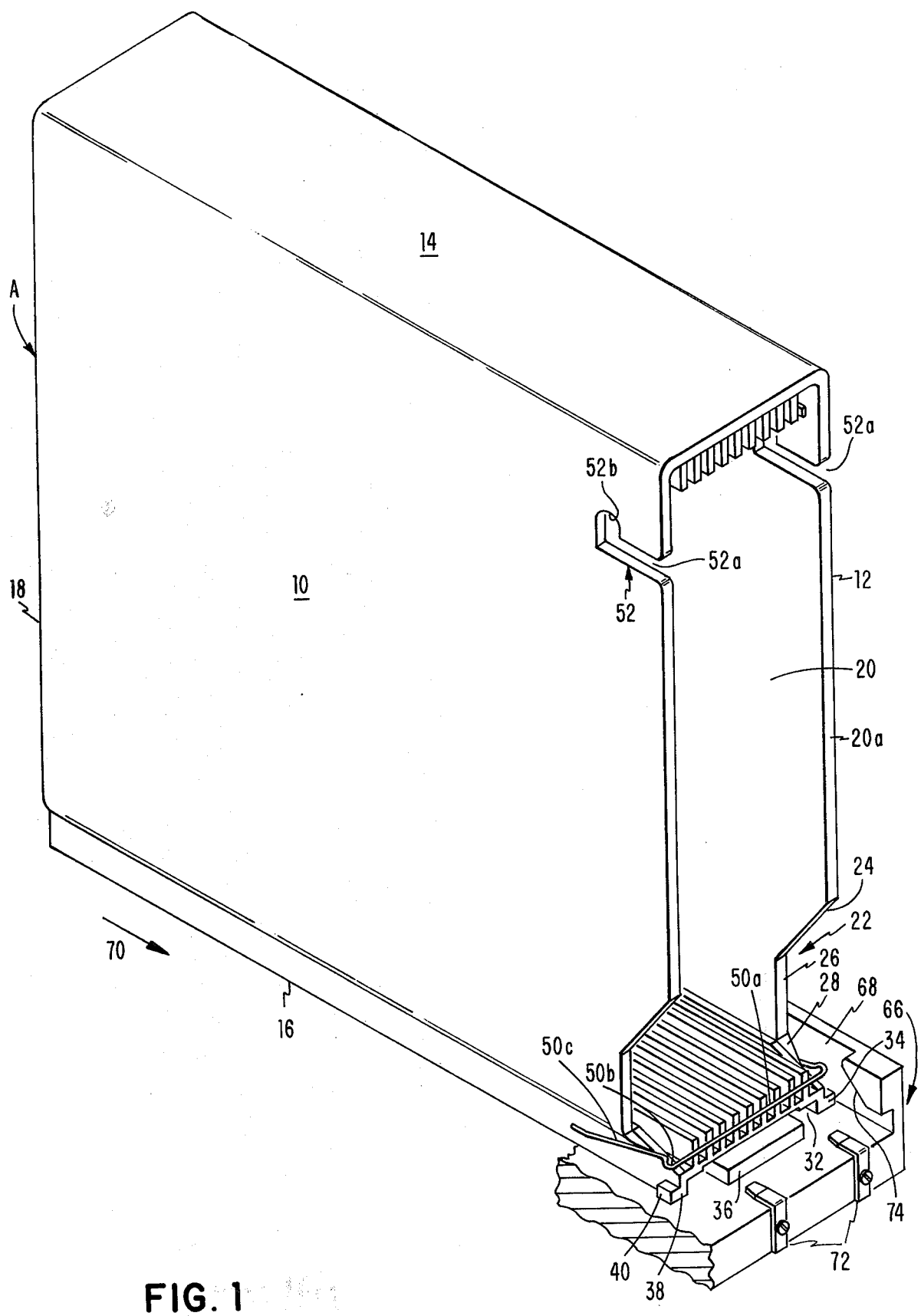
FIG. 1 is an isometric view of the magazine of the lid-magazine combination of the invention and showing the magazine being inserted into a retaining cavity of a disk drive machine, for example.
Figure 6:
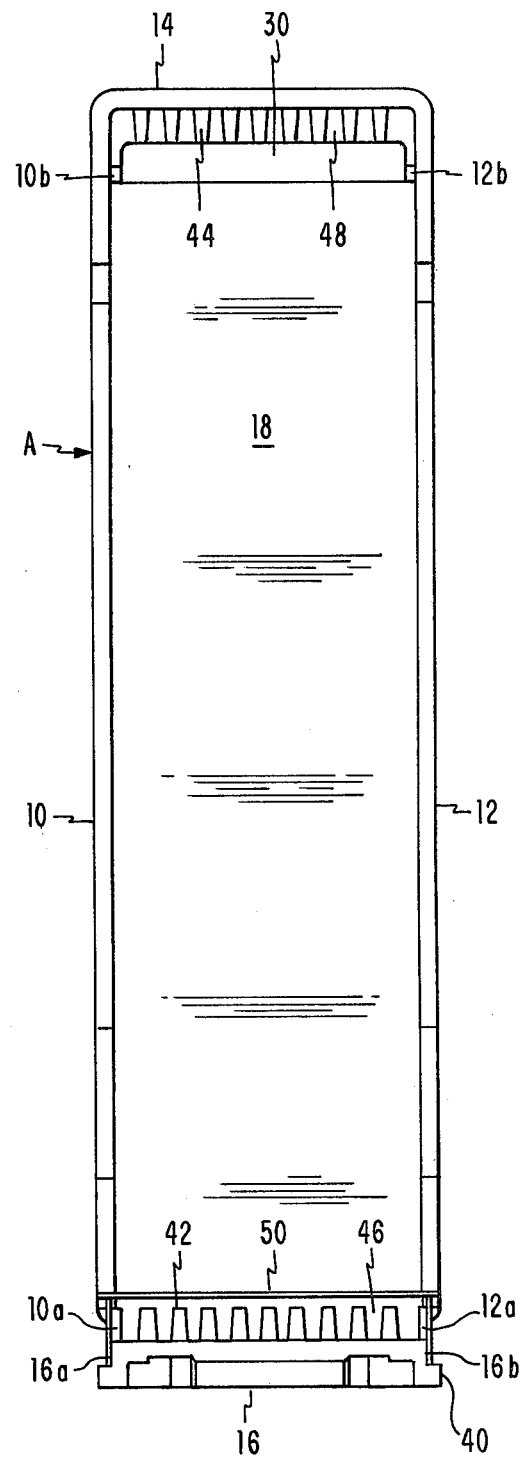
FIG. 6 is an end view of the magazine.
Figure 3:
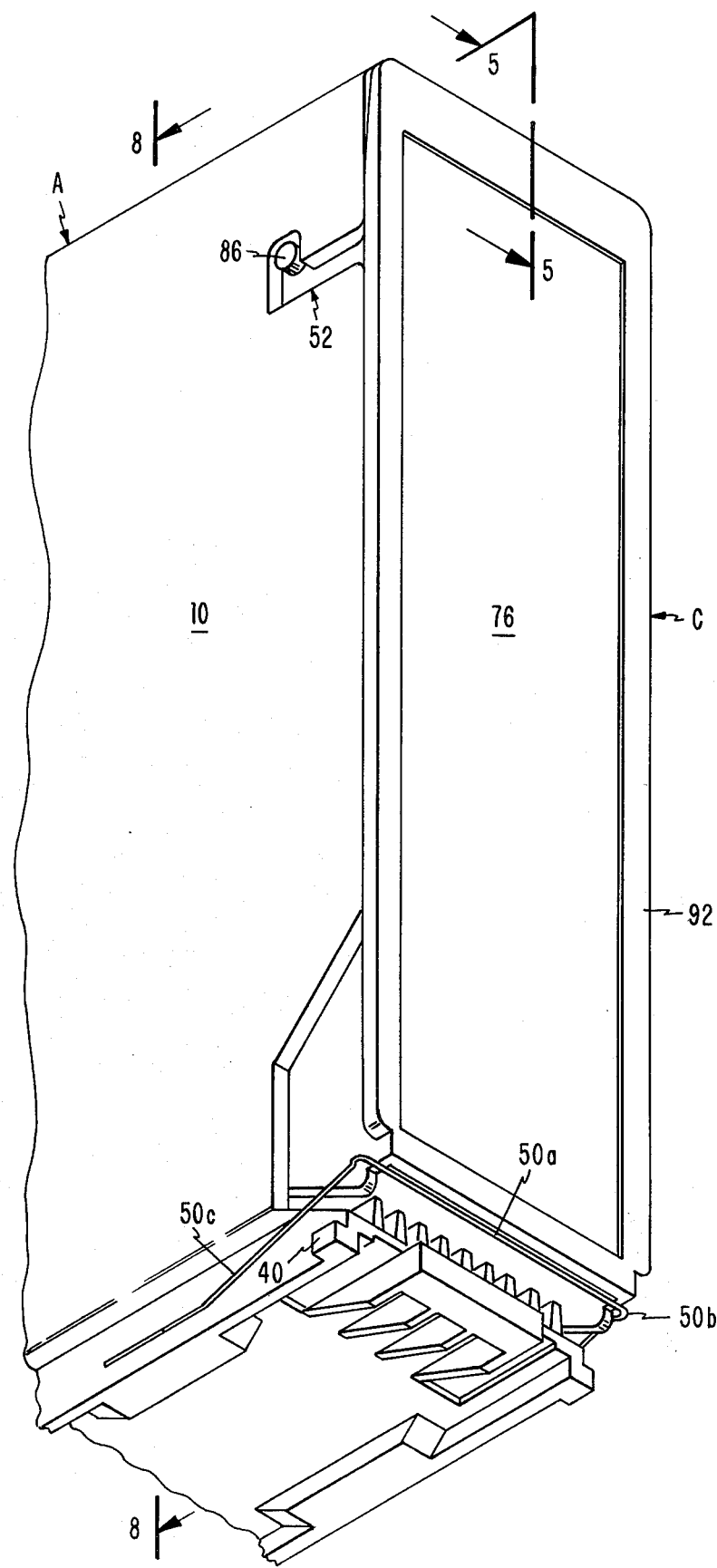
FIG. 3 is an isometric view of the magazine and lid combination with the lid installed on the magazine.

Referring particularly to FIGS. 1 and 6, the magazine A may be seen to comprise a pair of nearly square side panels 10 and 12 and oblong top panel 14, bottom 16 and back panel 18. Without a lid in place on the magazine A, the forward end of the magazine provides a front opening 20 in the magazine defined by a front edge 20a on panels 10, 12 and 14. The panels 10 and 12 are parallel with each other; and the panel 14, the bottom 16 and the end 18 are thus of equal widths which are considerably less than their lengths, as shown.

Each of the side panels 10 and 12 is provided with a notch 22 extending from the forward edge of the panels toward the back panel 18 and formed by edge portions 24, 26 and 28. The edge portions 26 extend substantially parallel with the back panel 18, and the edge portions 24 slant upwardly and forwardly from the edge portions 26, while the edge portions 28 slant downwardly and forwardly from edge portions 26. The interior surface of the back panel 18 is smooth and without any ribbing, and the back panel 18 is provided with an opening or window 30 in it adjacent the top panel 14.

The bottom 16 on the fore-portion of the magazine A is formed with a pair of notches 32 disposed between forwardly extending protrusions 34, 36 and 38. A sidewardly extending stop 40 is provided on each of the protrusions 32 and 38. The magazine bottom 16 is formed on its internal surface with upwardly extending ribs 42, and the top panel 14 is provided on its internal surface with an equal number of downwardly extending ribs 44. The ribs 42 provide grooves 46 between them, and the ribs 44 provide grooves 48 between them. There are an equal number of ribs 42 and 44, and the grooves 46 are thus in alignment respectively with the grooves 48. One side of an end groove 46 is formed by an inwardly extending portion 12a of the side panel 12, and one side of an end groove 48 is in effect formed by an inwardly extending side rib 12b on panel 12. The portions 12a and 12b in effect make the end grooves 46 and 48 respectively of the same effective width as the other grooves 46 and 48. Similar inwardly extending portions 10a and 10b formed in the side panel 10 have the same effect with respect to the opposite end grooves 46 and 48.

A retainer 50 in the form of a U-shaped spring wire extends from one side 16a to the other side 16b of the magazine bottom 16. The retainer 50 has a transversely extending medial portion 50a; and, in the unstressed condition of the retainer 50, the medial portion 50a has an elevation slightly higher than the upper ends of the ribs 42 as is shown in FIG. 6. The retainer 50 also has a pair of opposite semiloop portions 50b and a pair of opposite straight portions 50c connected to the portions 50b. The retainer 50 is anchored within the magazine bottom 16 at the rear ends of the portions 50c by any suitable means and in such a manner so that a downward force on the retainer portion 50a does not provide pivoting of the retainer portions 50c with respect to the magazine A, but the downward force on the portion 50a rather depresses the portion 50a against the inherent resilience of the portions 50c. With such downward movement of the retainer portion 50a, the semiloop portions 50b eventually abut the stops 40; and, in these positions of the retainer parts, the medial retainer portion 50a lies below the bottoms of the grooves 46 as they are illustrated in FIG. 6.

The side panels 10 and 12 are each provided with an L-shaped slot 52 adjacent but spaced from the top panel 14 and remote from the bottom 16 opening on the forward edge of the magazine A. Each of the slots 52 includes an initial horizontally extending slot portion 52a (parallel with the top panel 14) and an upwardly extending slot portion 52b (extending toward the top panel 14) and connected with the back end of the slot portion 52a.

Figure 7:
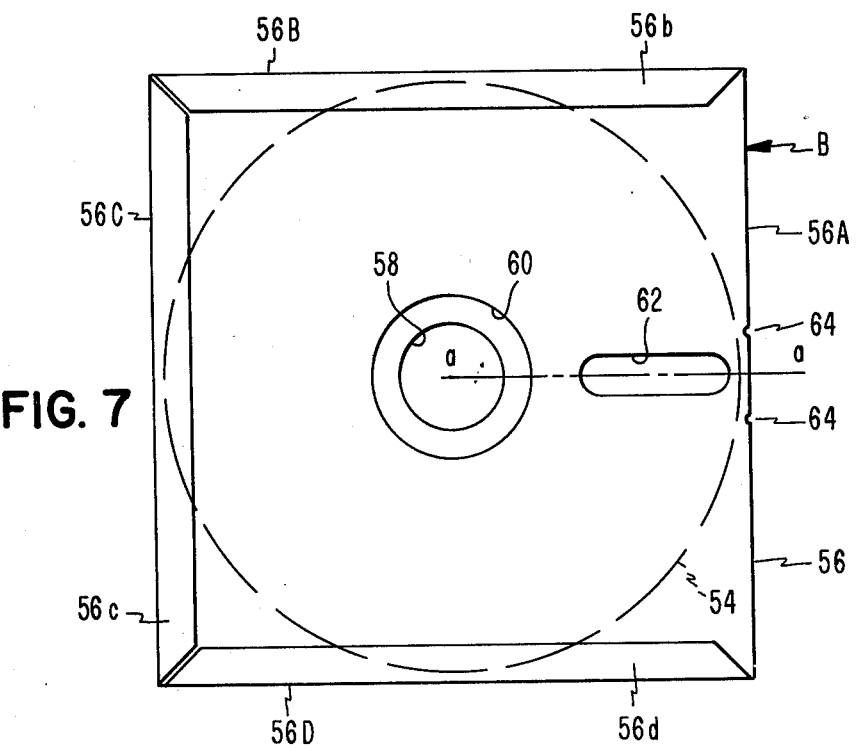
FIG. 7 is a side elevational view of a magnetic diskette or disk-jacket combination intended for use with the magazine-lid combination.

A magnetic diskette or disk-jacket assembly B, of a type which may be loaded either singly or in a plurality in the magazine A, is shown in FIG. 6 and is generally of the type disclosed in U.S. Pat. No. 3,668,658. The diskette B includes a magnetic disk 54 rotatably disposed within a containing jacket 56. The disk 54 is of a thin flexible material, such as polyethylene terephthalate of about 0.003 inch (0.076mm) thickness, and the jacket 56 is semi-flexible but is of a thickener material such as of about triple the disk thickness. The jacket 56 has edges 56A, 56B, 56C and 56D. The jacket 56 is folded over on its edge 56A to have two thicknesses and is formed with overlapping flaps 56b, 56c and 56d on its other edges so that the jacket 56 is actually three thicknesses thick on these other edges. The disk 54 is provided with a central opening 58 therein, and the jacket 56 in its two thicknesses is provided with openings 60 concentric with the disk opening 58. The jacket 56 in its two thicknesses is also provided with oblong slots 62 on a horizontal radial center line a-a as the diskette is shown in FIG. 7 and located between openings 60 and edge 56A, and a pair of edge notches 64 are provided on edge 56A and on opposite sides of this center line extending through the slots 62. The diskette B is used with suitable rotatable driving mechanisms extending through the central disk opening 58, and magnetic transducers extend through the opposite slots 62 into contact with the disk 54 for data transfer. The edge notches 64 on opposite sides of the slots 62 make the diskette B more flexible in the region of the slots 62 so that the transducers may have a more reliable and constant bearing action on the disk 54 for good data transfer even though the disk 54 may be slightly warped.

The diskettes B may be inserted into the magazine A by manually depressing the medial retainer portion 50a so that it is below the bottoms of the grooves 46 and so that the semiloop retainer portions 50b rest on the stops 40. The ends of the slots 46 are then open, and a plurality of the diskettes B may be slid into the opposite grooves 46 and 48 with the edges 56B and 56D respectively being in the bottom and top grooves 46 and 48 and with the edge 56C leading (a diskette B is flipped over from its FIG. 7 position for insertion). The diskettes B are slid inwardly in magazine A to have their edges 56C in contact with the smooth inner surface of the back panel 18, and the diskettes A are thus completely received in the magazine A with the bottom edges 56B and 56D of each diskette A being completely in opposite corresponding grooves 48 and 46. The retainer 50 may then be released, and it springs upwardly into position as shown in FIG. 6 (at an elevation higher than the tops of the ribs 42), and the diskettes B are thus selectively retained within the magazine A. The diskette edges 56A having the notches 64 in them are thus at the forward end of the magazine A, within the opening 20.

The loaded magnazine A may be used with the machine portion 66 shown in FIG. 1 which may constitute a part of a disk file unit having transducers for data transfer with respect to the disk 54. The machine portion 66 includes an elongate recess 68 for receiving the magazine A, and the magazine A is moved in the direction 70 in order to fully place the magazine A in proper position in the machine portion 66. The machine portion 66 has a pair of guides 72 at the front end of the slot 68, and the magazine A in moving in direction 70 moves onto the guides 72, with the slots 32 receiving the guides 72 and the guides 72 thus properly positioning the magazine A transversely in the recess 68. A pair of opposite cam surfaces 74 are provided at the forward end of the recess 68, and as the magazine A is moved in the direction 70 the semiloop portions 50b of the retainer 50 contact the cam surfaces 74. On continued movement of the magazine A in directon 70, the cam surfaces 74 force the retainer 50 downwardly against the spring action of the retainer portions 50c and thus move the medial retainer portion 50a downwardly into a position in which it is below the bottoms of the grooves 46. The machine may includes diskette gripping mechanism which is then effective to pull the diskettes B individually out of the slots 46 and 48 for disk processing.

Figure 2:
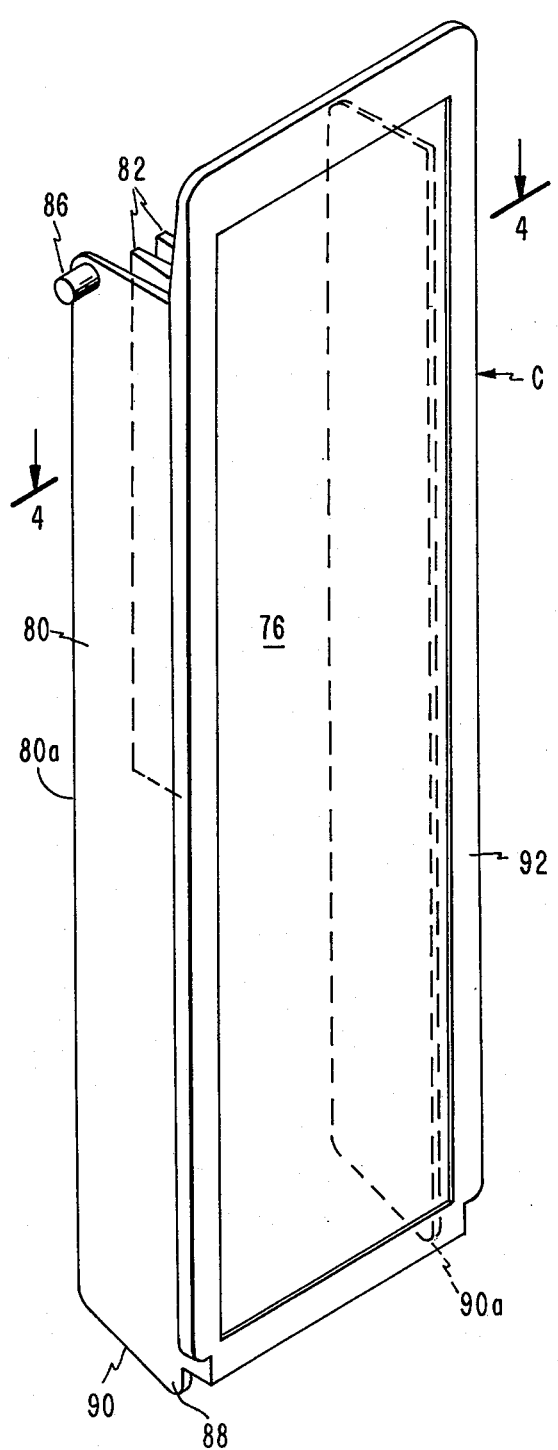
FIG. 2 is an isometric view of the magazine lid.
Figure 4:
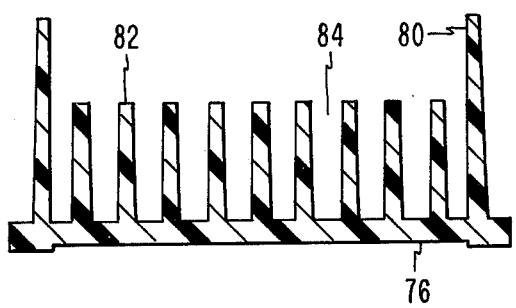
FIG. 4 is a sectional view on an enlarged scale taken on line 4—4 of FIG. 2.
Figure 5:
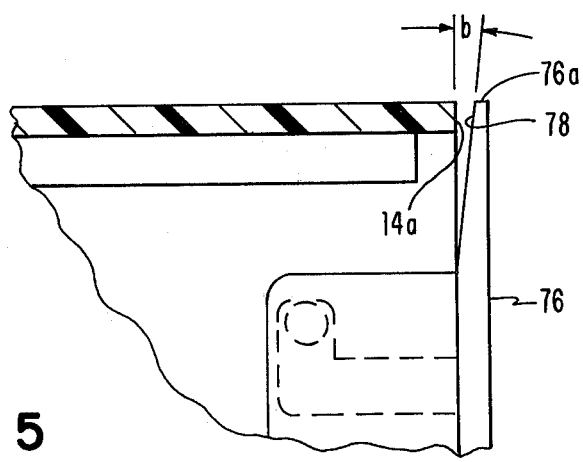
FIG. 5 is a fragmentary sectional view taken on line 5—5 of the magazine-lid combination shown in FIG. 3.

The lid or cover C shown in FIG. 2 may be used for closing the front opening 20 of the magazine A with the diskettes B in place within the magazine A when the magazine A and its diskettes B are not in use. The lid C comprises a front panel 76 which has a beveled or chamfered internal top surface 78 that extends at an angle b with respect to vertical, assuming that the panel 76 is vertical (see FIG. 5). The lid C includes two side ribs 80 which extend for substantially the complete height of the cover C, and these ribs taper to narrower thicknesses at their edges remote from the front panel 76. The lid C also includes ribs 82 intermediate the side ribs 80, and the ribs 82 are shorter in length and extend only substantially to the center of the lid C considering the vertical dimension of the lid C. The ribs 80 and 82 are of equal thicknesses of their bases, and the ribs 80 due to their height taper to narrower cross-sections at their edges remote from the panel 76 in comparison with the ribs 82. The ribs 80 and 82 provide grooves 84 between them as shown in FIG. 4 in particular which correspond in number, spacing and width to the grooves 48. Each of the ribs 80 is provided with an outwardly extending pin 86 adjacent its top edge and is provided with a downwardly slanting cam edge 90 radiused on its inside edge to prevent catching on flap 56b. A marginal flange 92 is provided about the two side edges and top edge of the panel 76.

With the magazine A being disassociated from the machine portion 66 and containing a plurality of diskettes B, such as a full complement of diskettes B, positioned in the grooves 46 and 48, the lid C may be applied onto the magazine by initially sliding the pins 86 into the horizontal slot portions 52a, with the ribs 80 lying on the inside surfaces of the side panels 10 and 12. The rib portions 10b and 12b and the increased transverse internal width of the magazine A provided by the outwardly flaring portions 10a and 12a provide the necessary space along the internal surfaces of the side panels 10 and 12 for receiving the ribs 80. The upper corners of the ribs 82 at this time enter the spaces between the diskettes B and assure that only one rib 82 at this time or with subsequent closing movement of the lid C lies in each of the spaces between adjacent diskettes which are initially spaced by the upper and lower ribs 42 and 44. The upper ends of the ribs 82 are somewhat spaced from the upper end of the panel 76 and lie below the lower ends of the ribs 44 at this time, and therefore there is an easy entrance of the ribs 82 into the spaces between the diskettes B. At this time, the lid C slants downwardly and outwardly with respect to the front edge 20a of the magazine A, and the flange 92 is spaced considerably farther from the edge 20a at its bottom than at its top. When the pins 86 are in the slot portions 52a, the medial portion 50a of the spring retainer 50 assures that the bottom of the lid C cannot prematurely be swung closed with respect to the magazine edge 20a, since the retainer medial portion 50a will at this time abut against the inner edges 80a of the lid C. As the movement of the pins 86 through the slot portions 52a continues with corresponding movement of the lid C as a whole, the chamfered surface 78 of the lid C approaches and finally makes contact with the edge 20a at the top of the magazine A. The existence of the chamfered surface 78 of the lid C assures that the pins 86 may reach the ends of the slots portions 52a with the stance of the lid remaining substantially as above-mentioned, namely slanting downwardly and outwardly with respect to the front edge 20a of the magazine.

A completion of the closing action of the lid C is attained by moving the lid C upwardly on the front magazine edge 20a. The pins 86 move upwardly in the slot portions 52b, and the cam edges 90 then make contact with the medial portion 50a of the retainer 50 and move the pins 86 to the upper ends of the slot portions 52b as the cam edges 90 ride on the medial portion 50b of retainer 50. A horizontal force is then applied onto the lower end of the lid C causing the cam edges 90 to cam the medial portion 50a of the retainer 50 downwardly as the lid C swings about the pins 86 to move the flange 92 into engagement with the front magazine edge 20a for a complete closing of the opening 20 by the lid C. The retainer portions 50c bend, and finally the medial portion 50a snaps up over the ends 90a of the lid portions 88 to lock the lid C on the magazine A.

The lid C may be released from the magazine A simply by depressing the retainer 50 to move the level of the medial portion 50a below the lower ends of the grooves 46, and the lower end of the lid C may be swung outwardly. During this movement of lid C, the upper edge of the chamfered surface 78 contacts and pivots on the upper part of magazine edge 20a, and the pins 86 may be moved downwardly in the slot portions 52b and outwardly in the slot portions 52a. A complete disassociation of the lid C may be made with respect to the magazine A by simply completing this swinging movement of the lid C away from the magazine A. In the event the operator, through lack of familiarity with the lid C and magazine A construction, puts upward force on the lid C holding the pins 86 at the upper ends of the slot portions 52b when he swings the lid C outwardly, the ribs 80 are of such flexibility due to their material to allow the pins 86 to snap out of the slot portions 52b without moving through the slot portions 52a and without breakage of either the lid C or magazine A.

It has been assumed so far in this dissertation that the magazine A is in a vertical disposition and that consequently the diskettes B are also vertically disposed. The lid C when closing the magazine A will of course function to keep dust out of the magazine A and therefore off of the diskettes B stored therein. This is valuable, since dust is a major cause of incorrect data transfer. However, the lid C when installed on the magazine A has still another and even more valuable function with respect to the diskettes B stored in the magazine A, and this function is in relation to the storage of the magazine in a horizontal disposition which the operator may wish to use.

Figure 9:
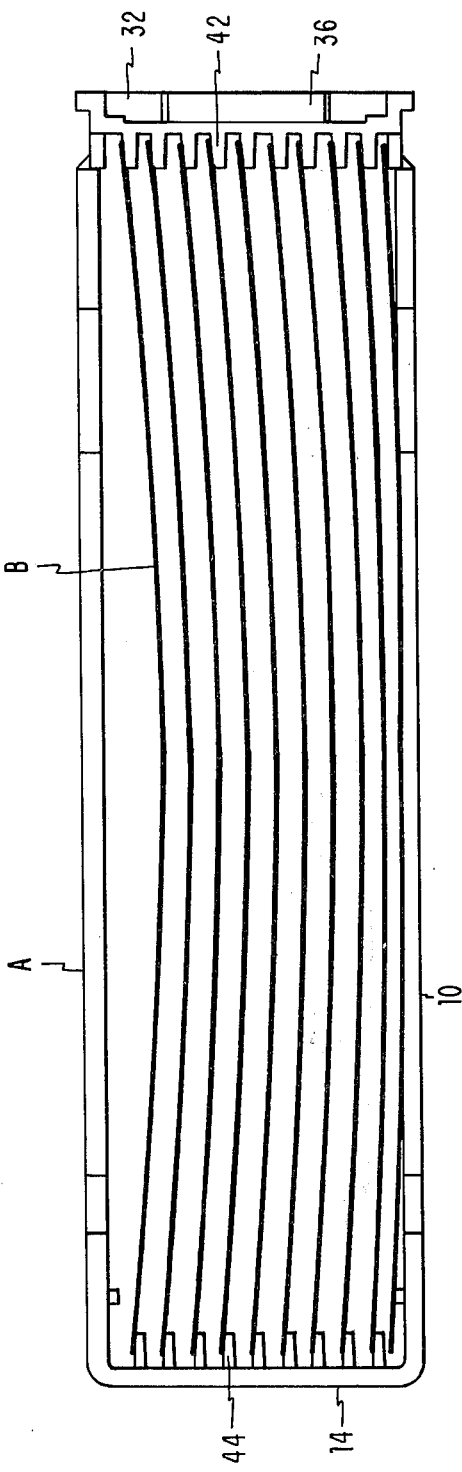
FIG. 9 is a view similar to FIG. 8 but showing the diskettes warped due to elevated temperature and without the lid in place on the magazine.

FIG. 9 shows the magazine A in a horizontal disposition with no lid C being used and with the storage of the diskettes B therein occurring for a relatively short time but perhaps at a somewhat elevated temperature. It will be observed from FIG. 9 that the diskettes B are warped downwardly, and this warping is permanent due to thermally induced creep and annealing of the material of the jacket 56. Therefore, when the magazine A with the diskettes B therein is subsequently used, the warped diskettes B cannot be expected to and do not provide reliable data transfer in the disk drive machine with which they are used. The warpage of the diskettes B is particularly due to the fact that each diskette jacket 56 is weakened adjacent the edge 56A which is that edge in the magazine opening 20. A disk drive utilizing the magazine A and diskettes B may be expected to require that the oblong slots 62 through which the transducers of the drive extend in order to provide a data transfer with respect to the magnetic disk 54 are necessarily on the end of the jacket which is drawn first out of the magazine A and into the disk drive machine, and in fact the edge 56C of the diskette B in use by the machine may remain in the magazine A. The oblong slots 62 weaken the diskette jacket 56 adjacent the jacket edge 56A, and the notches 64 in this edge have this same effect as is apparent; and this part of a diskette B tends to sag if stored horizontally and unsupported. The diskette jacket 56 is strengthened by the flaps 56b, 56c and 56d on its edges 56B, 56C and 56D by thus having three thicknesses of the jacket material along these edges. This is not particularly important except in connection with the jacket edge 56C which is in contact with the internally plane back panel 18 and is thus unsupported. However, since there are three thicknesses of the jacket material on the jacket edge 56C and since there are no notches or slots on this side of a diskette B, there is no tendency for a diskette B to sag on this edge even though it is not supported by ribs on the internal surface of the back panel 18. Incidentally, no ribs are desired on the internal surface of the back panel 18 in order that there can be no impediment of a complete insertion of a diskette B into the magazine A after the diskette has been at least partially withdrawn from the magazine A for a data transferring action, and such impediment could exist due to internal ribs on the back panel 18 if a diskette B being reinserted into the magazine A is warped slightly about vertical axes, the magazine A and diskettes B being assumed to be vertical.

Figure 8:
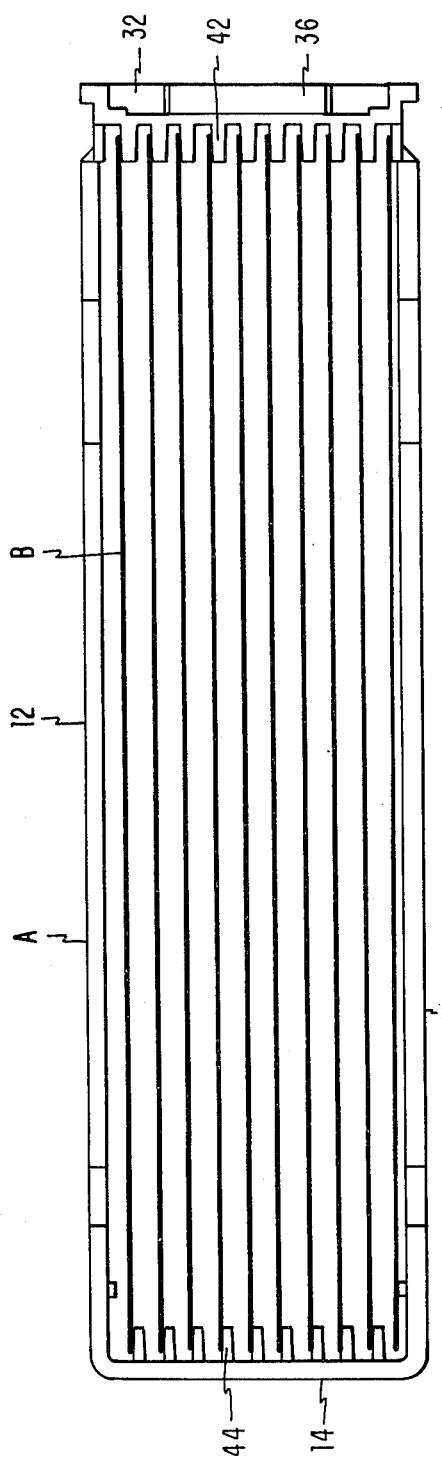
FIG. 8 is a sectional view taken on line 8—8 of FIG. 3 and showing the magazine laid on its side with a series of diskettes therein, the diskettes being supported by internal ribs of the lid.

The lid C, and particularly its ribs 82, prevent warpage of the diskettes B, particularly along the weakened jacket edges 56A. The ribs 82 extend into the spaces between the diskettes B coincident with the ribs 42 and 44 on the top panel 14 and magazine bottom 16, and the ribs 82 thus support the portions of diskettes B adjacent the jacket edges 56A and hold them flat and horizontal when the lid C has been installed on the magazine A as is shown in FIG. 8. Thus, even though the magazine A may be stored horizontally and on one of the panels 10 or 12, nevertheless, the ribs 82 within the lid C brace the diskettes B and prevent warpage of them.

We claim:

1. A container for disk assemblies each including a disk enclosed in a rectangular jacket, said container comprising:
   a bottom, a top panel, an end panel and a pair of side panels that connect said top and end panels and said bottom and providing the container with an opposite end that is open when unlidded,
   a lid for closing said open container end and completing the container when closing said open end,
   a plurality of spaced aligned ribs on the inside surface of said lid and said top panel and said bottom for holding the disk assemblies in the container in spaced relation with respect to each other, and
   a pivotal connection of said lid on said container including a pair of aligned L-shaped notches formed in said side panels and a pair of pins provided on said lid, said L-shaped notches being disposed adjacent said top panel and remote from said bottom and including initial notch portions extending from said open end of the container and parallel with said bottom and toward said end panel and ultimate notch portions in communication with said initial notch portions and extending parallel with said end panel and toward said top panel, said pins being provided adjacent an end of said lid and entering said initial notch portions with translatory movement of said lid to partially close said open end of the container with the ends of the ribs on the inside surface of said lid interleaving with translatory motion with said disk assemblies in the grooves between said ribs of said bottom and top panel and said lid swinging shut on the open end of said container when said pins move upwardly in said ultimate notch portions so as to fully close said open container end and bring the ribs of the lid into full interleaving relationship with said disk assemblies.

2. A container for disk assemblies each including a disk enclosed in a rectangular jacket, said container comprising:
   a bottom, a top panel, an end panel and a pair of side panels that connect said top and end panels and said bottom and providing the container with an opposite end that is open when unlidded, the inside surfaces of said top panel and bottom being provided with aligned spaced ribs for holding the disk assemblies in spaced relation within the container,
   a spring retainer anchored on the container adjacent said bottom and movable under spring action to a level higher than the levels of said ribs on said bottom for preventing the disk assemblies from sliding out of the container when the container is unlidded,
   a lid for said open end of the container,
   a pivotal connection of said lid on the container adjacent said top panel, and
   cam surfaces on the bottom end of said lid remote from its pivotal connection with the container for acting on said spring retainer and moving it in a direction away from said top panel so as to allow the spring retainer to snap across the bottom end of said lid and hold the lid in closed relation with the container.

3. A container for disk assemblies each including a flexible disk enclosed in a semi-flexible rectangular jacket which has a pair of aligned transducer receiving slots extending radially toward one edge of the rectangular jacket in its two thicknesses and thus weakening the jacket along this edge to bending, said container comprising:
   a bottom, a top panel, an end panel and a pair of side panels that connect said top and end panels and said bottom and providing the container with an opposite end that is open when unlidded, the inside surfaces of said top panel and bottom being provided with aligned spaced ribs for holding the disk assemblies in spaced relation within the container with their weakened edges being at the open end of the container so that the disk assemblies may be drawn out of the container with their weakened edges foremost, the inside surface of said end panel being smooth, unribbed and plane to permit the insertion of the disk assemblies fully into the container with edges of the disk assemblies opposite their said weakened edges being in full contact with said plane surface regardless of warpage of the disk assemblies,
   a closure applicable to said open end of the container for closing this end of the container, and
   a plurality of spaced ribs on the inside surface of said closure and in alignment with the ribs of said bottom and top panel for supporting the said weakened edges of said disk assemblies and preventing the bending of the disk assemblies along their said weakened edges when said closure is in place on the previously open end of the container.

4. In combination, a plurality of flexible disk assemblies each including a flexible disk enclosed in a semi-flexible rectangular jacket having a pair of aligned transducer receiving slots in its two thicknesses which extend radially toward one edge of the jacket and which thus weaken the jacket on this edge to bending stress, a container including a bottom, a top panel, an end panel and a pair of side panels that connect said top and end panels and said bottom and providing the container with an opposite end that is open when unlidded, the inside surfaces of said top panel and bottom being provided with aligned spaced ribs and said disk assemblies being in said container and held in spaced relation by said ribs with said weakened jacket edges being at said open end of the container, a lid closing said open end of the container for storing said disk assemblies therein, and a plurality of spaced ribs on the inside surface of said lid in alignment with the ribs of said bottom and top panel for holding said disk assemblies along their said weakened edges from bending and in spaced relation with respect to each other.

* * * * *